United States Patent [19]
Sato et al.

[11] Patent Number: 5,305,097
[45] Date of Patent: Apr. 19, 1994

[54] COMMUNICATING APPARATUS HAVING A CALLING PARTY NUMBER DISPLAY DEVICE

[75] Inventors: Ryoichiro Sato; Shuichi Kadowaki, both of Yokohama, Japan

[73] Assignee: Canon Kabushiki Kaisha, Tokyo, Japan

[21] Appl. No.: 628,178

[22] Filed: Dec. 17, 1990

[30] Foreign Application Priority Data

Dec. 20, 1989 [JP] Japan .................. 1-332424
Sep. 21, 1990 [JP] Japan .................. 2-253415

[51] Int. Cl.⁵ .................. H04M 11/00; H04N 7/14
[52] U.S. Cl. .................. 348/14; 348/18
[58] Field of Search .................. 379/53, 54, 96, 142; 358/85; H04N 7/14

[56] References Cited

U.S. PATENT DOCUMENTS

| | | | |
|---|---|---|---|
| 4,650,929 | 3/1987 | Boerger et al. | 379/54 |
| 4,827,085 | 5/1989 | Yaniv et al. | 379/96 |
| 4,870,677 | 9/1989 | Di Santo et al. | 379/96 |
| 4,885,580 | 12/1989 | Noto et al. | 379/96 |
| 4,962,521 | 10/1990 | Komatsu et al. | 379/53 |
| 5,001,709 | 3/1991 | Satoh | 370/110 |
| 5,018,186 | 5/1991 | Kimura et al. | 358/85 |
| 5,073,927 | 12/1991 | Grube | 358/85 |

FOREIGN PATENT DOCUMENTS

| | | |
|---|---|---|
| 0320828 | 6/1989 | European Pat. Off. . |
| 63-316966 | 12/1988 | Japan . |
| 1-212056 | 8/1989 | Japan . |
| 0212056 | 8/1989 | Japan .................. 379/53 |
| 1-220938 | 9/1989 | Japan . |
| 0158250 | 6/1990 | Japan .................. 379/53 |
| 2205465 | 12/1988 | United Kingdom . |

Primary Examiner—Curtis Kuntz
Assistant Examiner—Stella Woo
Attorney, Agent, or Firm—Fitzpatrick, Cella, Harper & Scinto

[57] ABSTRACT

There is disclosed a communicating apparatus such as a television telephone connected to the ISDN having a calling party number display service, including a receiving unit for receiving image data sent from a calling party communicating apparatus; a memory for storing the image data received by the receiving unit in correspondence to ID data indicative of the calling party communicating apparatus; and a display apparatus for receiving the ID data upon call reception from the calling party communicating apparatus and for reading out the image data corresponding to the received ID data from the memory and for displaying. Before a speech is started, the user can see the image information regarding the calling party and can immediately disconnect the communication if he does not want to speak to the calling party upon call reception therefrom.

12 Claims, 14 Drawing Sheets

COMMUNICATING APPARATUS HAVING A CALLING PARTY NUMBER DISPLAY DEVICE

BACKGROUND OF THE INVENTION

1. Field of the Invention

The present invention relates to a communicating apparatus which is connected to a network such as an ISDN or the like and executes a communication of a voice, an image, or the like and, more particularly, to a communicating apparatus for displaying a special image upon call reception.

2. Related Background Art

Hitherto, a television telephone set has been known as a multimedia communicating apparatus which can communicate a voice and an image.

Hitherto, in the television telephone set connected to the ISDN, when a call reception (reception calling) was performed, an ID number on the calling side (calling party telephone number) is informed to the reception side (CCITT Recommendation, calling number display of I. 251C). Therefore, the number is displayed on an image display apparatus and the telephone number of the calling party can be known.

However, in the above conventional technique, although the calling party telephone number itself can be known before the reception side responds to a call reception, in order to identify the calling partner from the telephone number, the user actually must learn a number of calling party telephone numbers by heart. Such a notification of the calling party telephone number is not so effective to identify the calling party before making a response in spite of the notification of the calling party telephone number.

As a method of solving such a drawback, it is also possible to use a method of knowing the name of the calling party by using a user.user signal (UUS) of the ISDN. As a method whereby information such as a calling party name or the like is sent from the originating call terminal, there has been known a method disclosed in U.S. patent application Ser. No. 307,506 filed on Feb. 8, 1989.

However, the above method has a problem because the calling party sends name information as a prerequisite and a special adding apparatus is needed.

On the other hand, there has been proposed a method whereby a correspondence relation between the telephone number on the originating call side and the calling party name has previously been input on the called side and the calling party name corresponding to the telephone number which coincides with the calling party number which was informed is displayed on an image display apparatus of a television telephone set (U.S. patent application Ser. No. 363,860 filed on Jun. 9, 1989 and continued as U.S. patent application Ser. No. 07/715,020 on Jun. 13, 1992).

However, there are problems such that in order to realize the above method, inputting means such as a television camera or the like needs to be newly provided and that it is necessary to previously execute complicated inputting operations.

SUMMARY OF THE INVENTION

It is an object of the invention to solve the drawbacks of the conventional techniques as mentioned above and to provide a communicating apparatus which can register an image regarding a calling party communicating apparatus which is displayed upon call reception by a simple method.

Another object of the invention is to provide a communicating apparatus which can register an image regarding a calling party communicating apparatus by a simple construction without providing any special inputting apparatus.

To accomplish the above object, according to the invention, there is provided a communicating apparatus including: receiving means for receiving image data which was sent from a calling party communicating apparatus; memory means for storing the image data received by the receiving means in correspondence to ID data indicative of the calling party communicating apparatus; and display means for receiving the ID data upon call reception from the calling party communicating apparatus and for reading out the image data corresponding to the received ID data from the memory means and displaying.

Another object of the invention is to provide a communicating apparatus with a simple construction in which just before a reception side responds to an incoming call, image information regarding a calling party which can be displayed on an image display apparatus on the reception side has previously been stored on the reception side by a simple operation.

Still another object of the invention is to improve information regarding a calling party communicating apparatus which is displayed upon reception.

That is, according to the invention, a plurality of sheets of information regarding the calling party communicating apparatus are displayed simultaneously or as a moving image upon reception.

Thus, the degree of recognition of the calling party communicating apparatus to the operator can be improved.

Further another object of the invention is to provide a communicating apparatus which can recognize a plurality of persons which use the apparatus of the same calling party number.

Further another object of the invention is to provide a communicating apparatus which can see the face of a person as a communication party upon reception.

Further another object of the invention is to provide a communicating apparatus in which information regarding a communication party is displayed upon reception and when the user does not want to communicate by checking the displayed information, a communication can be disconnected before data is received.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

First embodiment

Figure 1:
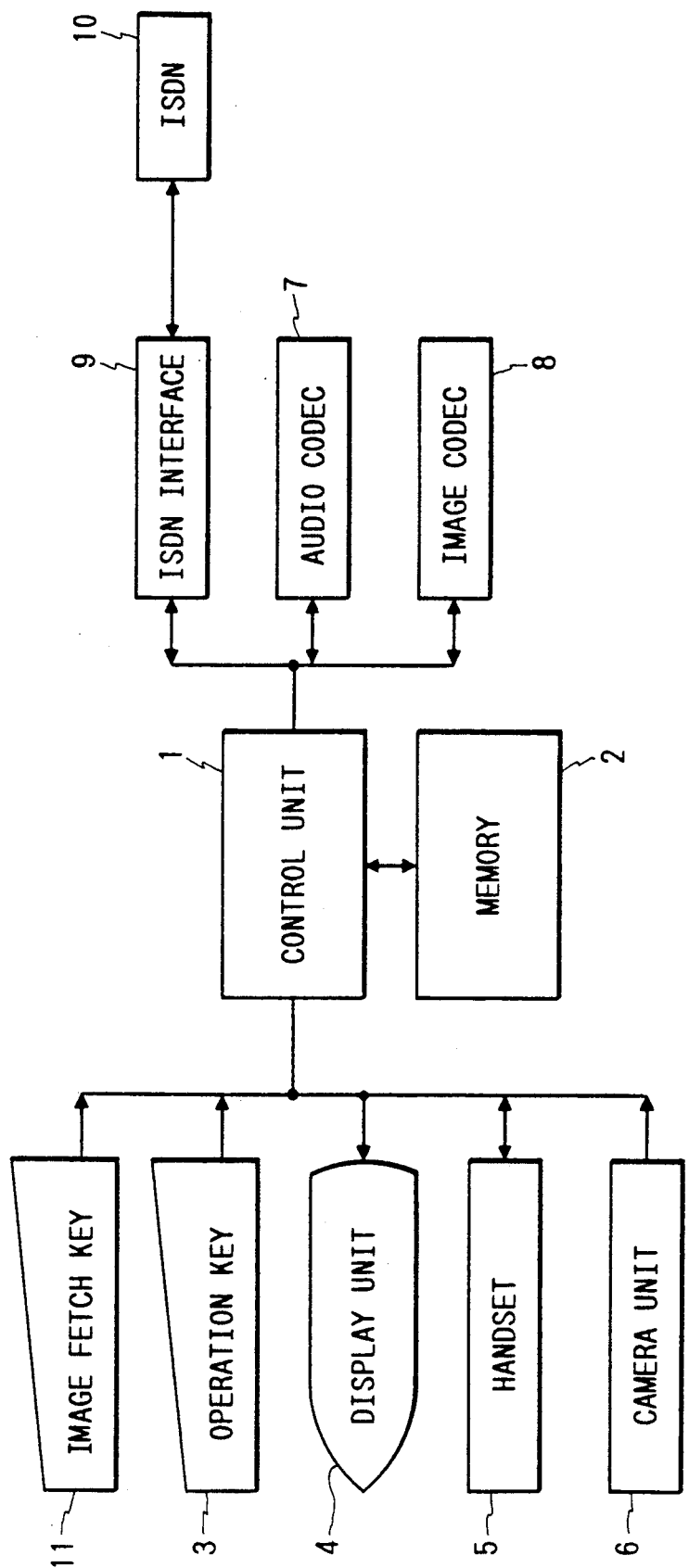
FIG. 1 is a whole arrangement diagram of a television telephone set which is connected to the ISDN according to the first embodiment of the invention.

FIG. 1 is a whole arrangement diagram of a television telephone set which is connected to the ISDN according to the first embodiment of the invention. In the diagram, reference numeral 1 denotes a control unit comprising a CPU for controlling the operation of the ISDN connected television telephone set, a ROM, and a RAM. A memory 2 is connected to the control unit 1. The following various apparatuses are connected to the control unit 1 through an I/O port (not shown). That is, to the I/O port, there are connected: an operation key 3 for designating and inputting a calling party telephone number or the like upon calling or the like from this side of the television telephone; an image display unit 4 comprising a CRT display for displaying image information which is sent from the calling party and the telephone number or the like of the calling party; a handset 5 as a transceiver for transferring a voice; a camera unit 6 for inputting an image on this side; an audio codec 7 for executing the A/D and D/A conversions between a digital signal which is processed by the ISDN and an audio analog signal which is input/output to/from the handset 5; an image codec 8 for executing the D/A conversion from the digital signal of the ISDN into the image analog signal of the display unit 4 and the A/D conversion from the image analog signal of the camera unit 6 into the digital signal of the ISDN; and an ISDN interface 9 for connecting an ISDN (integrated services digital network) 10 and the television telephone, respectively. Further, an image fetch key 11 having a push switch is connected to the I/O port. The image fetch key 11 generates a command signal to store a calling side image such as a face of the person on the calling party side or the like into the memory 2 by a pushing operation.

Figure 2:
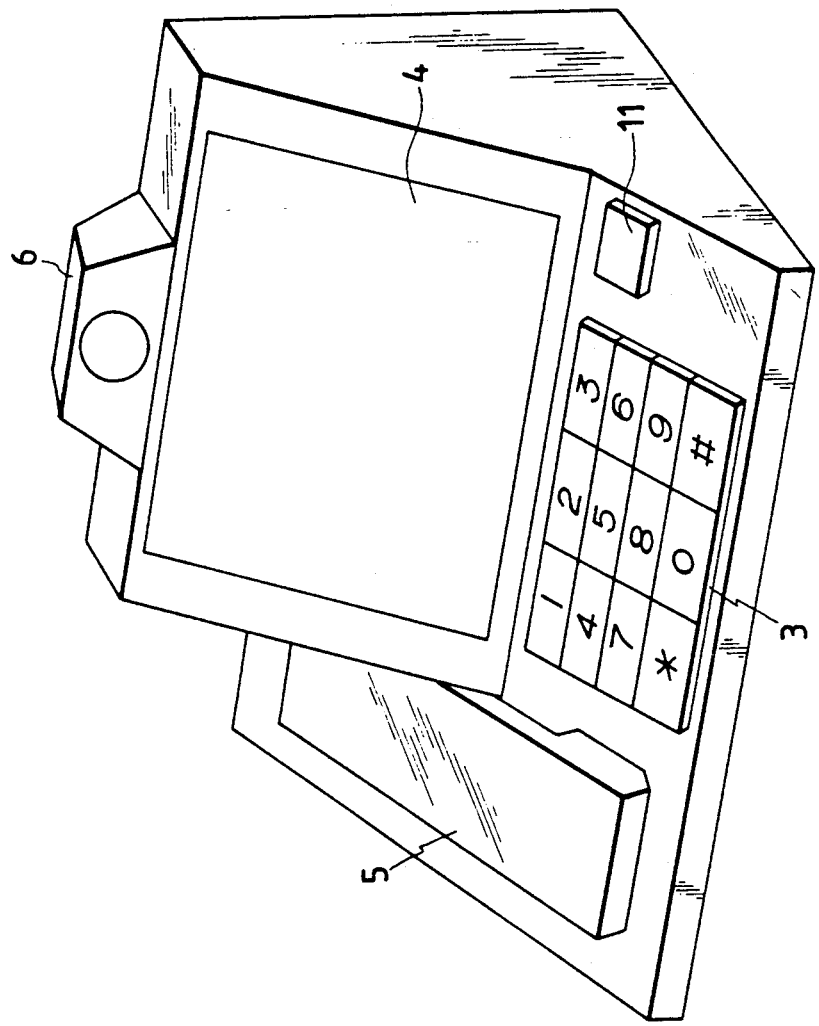
FIG. 2 is an external view of the television telephone set connected to the ISDN shown in FIG. 1.

FIG. 2 shows an external view of the television telephone set connected to the ISDN constructed as mentioned above.

Figure 3:
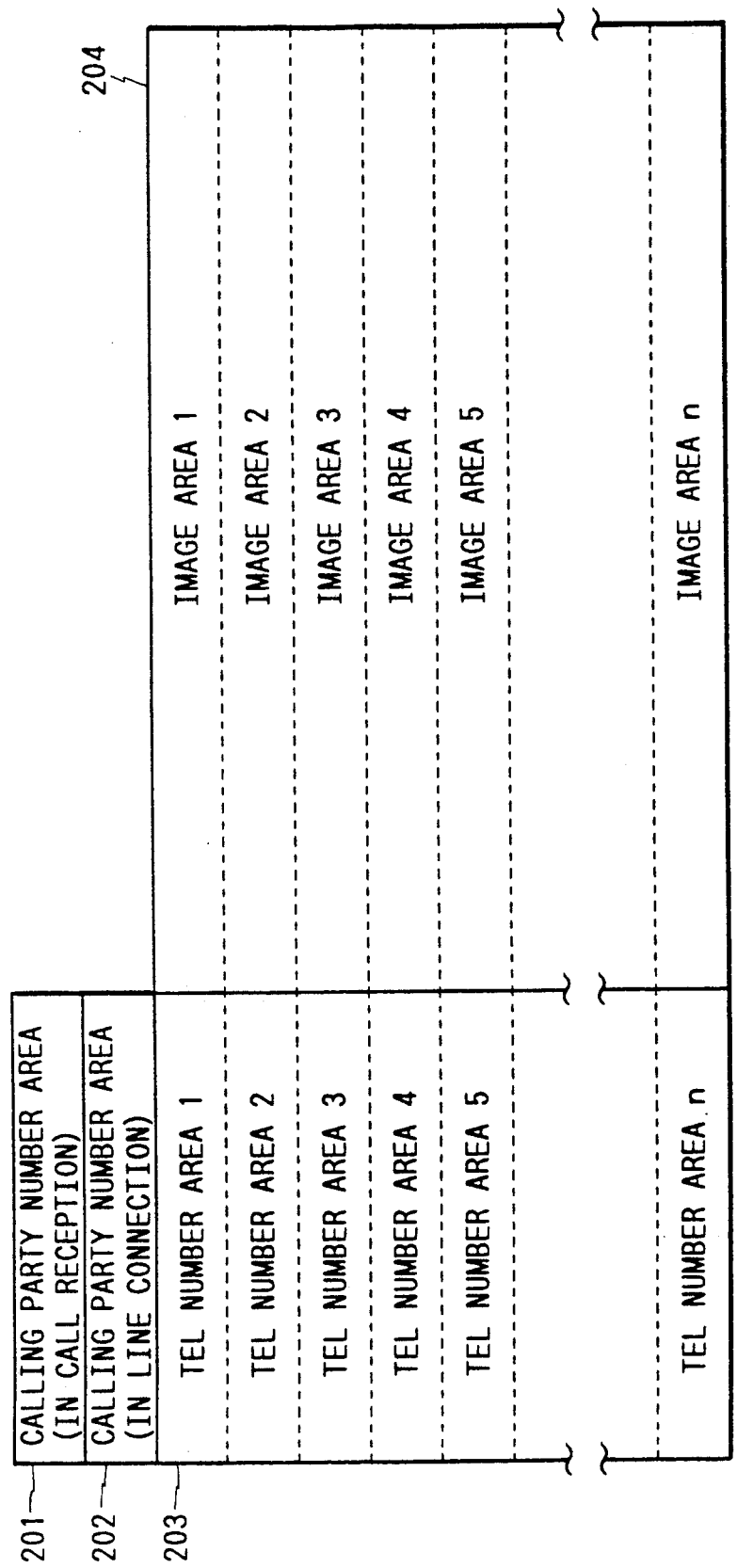
FIG. 3 is a constructional diagram of a memory 2 shown in FIG. 1.

FIG. 3 shows a part of a construction in the memory 2. The memory 2 is constructed by a volatile memory device comprising four areas 201 to 204. Reference numeral 201 denotes the calling party number area in call reception for storing the calling party telephone number (destination side telephone number) which is sent from the ISDN upon call reception (calling on the reception side) and 202 indicates the calling party number area in line connection for storing the calling party number when the line is connected, that is, while, speech is being executed. Upon reception of the call from the calling party, the calling party number which is sent from the ISDN is stored into the area 202. Upon calling from this side, the calling party number which was input by using the operation key 3 is stored into the area 202. Reference numeral 203 represents n telephone number areas of Nos. 1 to n each for storing the telephone number. Reference numeral 204 indicates n image areas of Nos. 1 to n each for storing image information in correspondence to the areas in the area 203.

A procedure for a fetching (storing) control of image information which is executed by the control unit 1 will now be described in detail in accordance with a program flowchart shown in FIG. 4. This program is executed when the image fetch key 11 was pushed (depressed) when the line is connected, that is, while an image from the calling party is being received.

In the first step S401, the calling party number stored in the calling party number area 202 in line connection, that is, the calling party number which is sent from the ISDN in the case of the call reception by calling from the calling party side or the calling party number which was input by the operation key 3 in the case of the calling from this side is read out. The calling party number in line connection is stored into the area 202 upon reception or key inputting operation.

A pointer to designate an object to be compared is set into the top telephone number area of No. 1 in the area 203 (step S402). A check is made to see if the number information stored in the telephone number area of No. 1 coincides with the calling party number which was read out in step S401 or not (step S403). If NO in step S403, the pointer is sequentially moved to the next telephone number area (the telephone number area of No. 2 in this case) (step S404). In step S405, a check is made to see if the comparison between the calling party number which had been read out in step S401 and all of the telephone numbers stored in the whole areas in which the telephone numbers had been stored in the telephone number area 203 has been completed or not. That is, a check is made to see if the pointer has been moved to all of the telephone number areas in which the telephone numbers had been stored and the point has arrived at the telephone number area in which no telephone number is stored or if there is no area to which the pointer moves (the pointer has already reached the last telephone number area of No. n) or not as a result of the movement of the pointer. If NO in step S405, that is, if the comparison between the calling party number (i.e., destination side number) which was read out in step S401 and all of the telephone numbers in the whole areas in which the telephone numbers have been stored in the telephone number area 203 is not completed yet, the processing routine is returned to step S403. The processes in steps S403 to S405 are repeated.

When the calling party number which was read out in step S401 coincides with the telephone number stored in any one of the areas of Nos. 1 to n in the telephone number area 203 (if YES in step S403), the image which had been received from the calling party through the ISDN and was displayed in the image display unit 4 is stored (step S406) into the image area corresponding to the telephone number area in which the coincident telephone number has been stored. The present p finished. The execution of step S406 changes the image which has already been stored.

If YES in step S405, that is, if the number corresponding to the calling party number which was read out in step S401 cannot be found out from all of the areas in the telephone number area 203, a check is made to see if a vacant area in which no telephone number is stored exists in the telephone number area 203 or not (step S407). If YES in step S407, the calling party number which was read out in step S401 is stored into the top area in the vacant area and the image information which was received from the calling party and displayed in the image display unit 4 is stored into the image area corresponding to the relevant area into which the calling party number was stored (step S408). The present program is finished. On the other hand, if NO in step S407, the storage contents of a predetermined set of areas in the telephone number area 203 are erased and the calling party number which was read out in step S401 and the image information displayed in the display unit 4 are respectively stored (updated) (step S409). The predetermined set of areas can be also changed in accordance with the order of the area numbers (1, 2, ..., n) every completion of the storing and updating processes.

As mentioned above, by merely pushing the image fetch key 11 in the line connection, the image of the face of the person on the calling party side upon speech communication can be easily stored in correspondence to the calling party telephone number irrespective of the reception and transmission. That is, the calling party telephone number and the image information which is peculiar to the calling party are stored in correspondence to each set of the telephone number area 203 and the image area 204 corresponding thereto.

Figure 5:
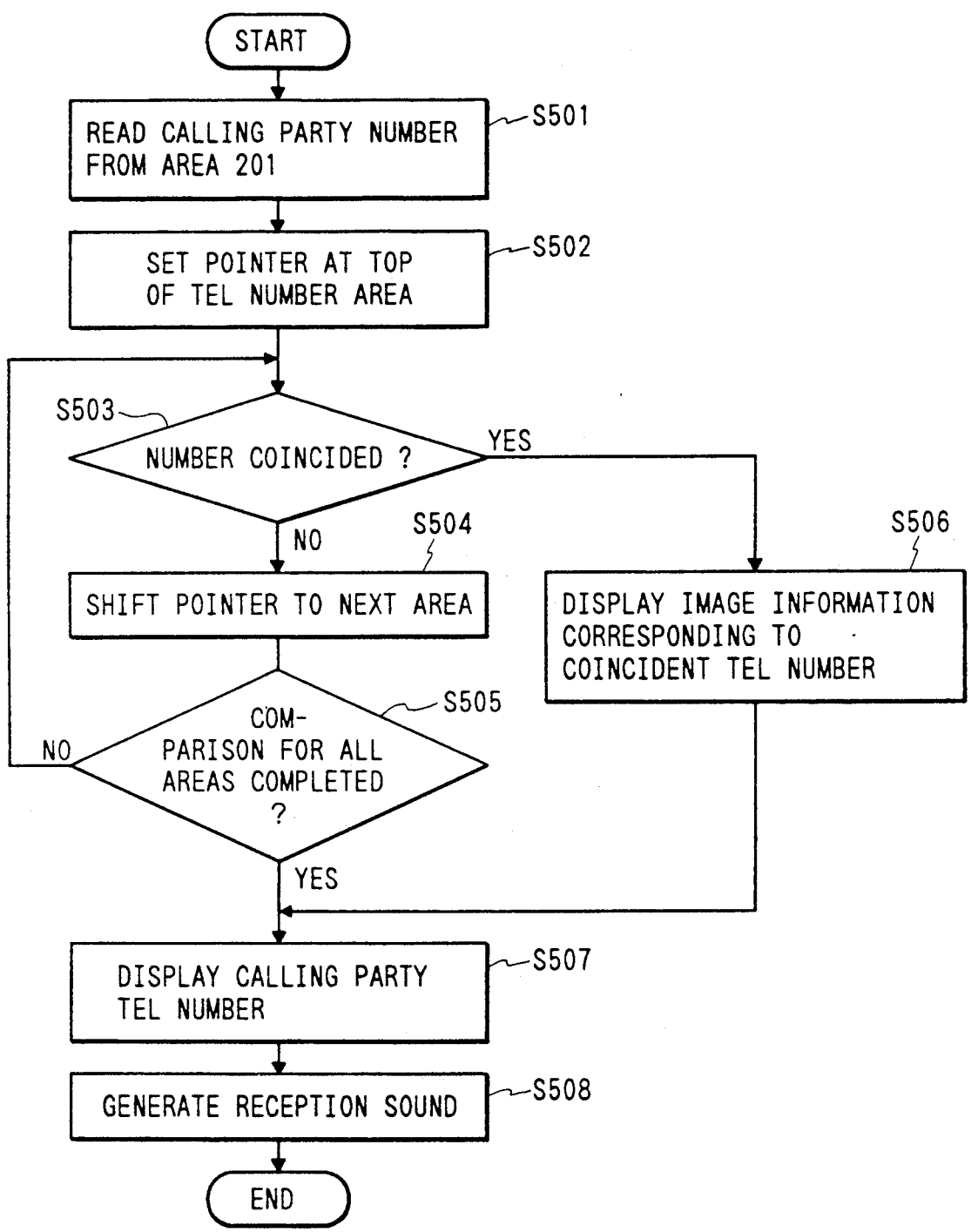
FIG. 5 is a program flowchart showing a display control procedure of image information which is executed in the control unit 1 shown in FIG. 1.

A procedure of the display control of image information which is executed by the control section 1 and is used to access the image information stored as mentioned above upon reception of a call and to display the image information by the image display unit 4 will now be described in detail in accordance with a program flowchart shown in FIG. 5. This program is executed with every reception of a call (calling on the reception side).

In the first step S501, the calling party number (i.e., destination number) stored in the calling party number area 201 in call reception, that is, the calling party number which is sent from the ISDN is read out. The calling party number is stored in the area 201.

Then, the pointer to designate an object to be compared is set into the top telephone number area of No. 1 in the telephone number area 203 (step S502). A check is made to see if the calling party number stored in the telephone number area of No. 1 coincides with the calling party number which was read out in step S501 or not (step S503). If NO in step S503, the pointer is sequentially moved to the next telephone number area (the telephone number area of No. 2 in this case) (step S504). In step S505, a check is made to see if the comparison between the calling party number which had been read out in step S501 and all of the telephone numbers in the whole areas in which the telephone numbers had been stored in the telephone number area 203 has been completed or not. That is, a check is made to see if the pointer has been moved to all of the telephone number areas in which the telephone numbers had been stored and the pointer has reached the telephone number area in which no telephone number is stored or there is no area to which the pointer moves (the pointer has already reached the last telephone number area of No. n) or not as a result of the movement of the pointer in step S504. If NO in step S505, that is, if the comparison between the calling party number which was read out in step S501 and all of the telephone numbers in the whole areas in which the telephone numbers have been stored in the telephone number area 203 is not completed yet, the processing routine is returned to step S503 and the processes in steps S503 to S505 are repeated.

If the calling party number which was read out in step S501 coincides with the telephone number stored in any one of the areas in the telephone number area 203 (namely, if YES in step S503), the image information stored in the image area corresponding to the telephone number area in which the coincident telephone number has been stored is displayed in the display unit 4 (step S506) and the processing routine advances to step S507, which will be explained hereinafter.

If YES in step S505, that is, if the number corresponding to the calling party number which was read out in step S501 cannot be found in any of the areas in the telephone number area 203, only the calling party number which was sent from the ISDN is displayed in the display unit 4 (step S507). reception sound to indicate call reception is generated (step S508) and the present program is finished.

If step S507 was executed after the image information had been displayed in step S506, both of the image information and the calling party number are displayed by the display unit 4.

As mentioned above, not only the calling party number is displayed in the image display unit 4 upon call reception but also the image information which is peculiar to the calling party, for instance, the image of the face or the like of the person on the calling party side is displayed in the image display unit 4. Thus, the calling partner can be easily presumed before response and the user can prepare for a response.

In the above embodiment, the calling party number area 201 upon call reception and the calling party number area 202 in line connection have separately been provided in the memory 2. However, the invention is not necessarily limited to such a construction. The functions of both of those areas can be also performed by a single area.

Figure 4:
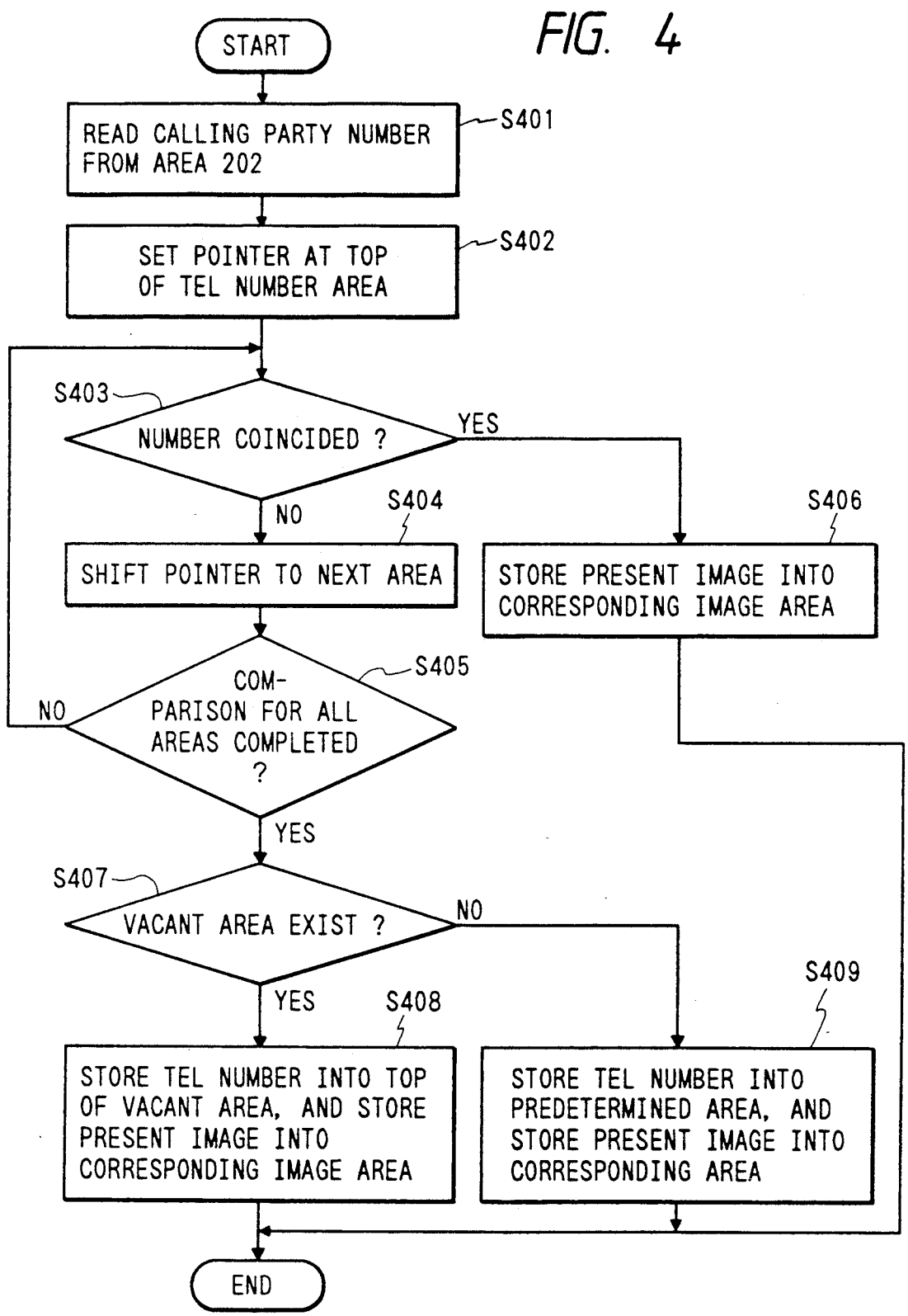
FIGS. 4 and 6 are program flowcharts showing fetching (storing) control procedure of image information which are executed in a control unit 1 shown in FIG. 1.

On the other hand, it is not always necessary to provide an image fetch key 11 but, for instance, it is also possible to execute the program of FIG. 4 when a * key and a 0 key in the operation key 3 were simultaneously depressed. Or, it is also possible to provide a touch sensor for the image display unit 4 and to execute the program of FIG. 4 by touching the image display unit 4.

Further, it is also possible to construct in a manner such that a touch panel is attached to the image display unit 4 and by touching a predetermined position of an image which is displayed in the image display unit 4, an inputting operation to the control unit 1 is executed, and the image fetch key 11 also has the function of the operation key 3.

Figure 6:
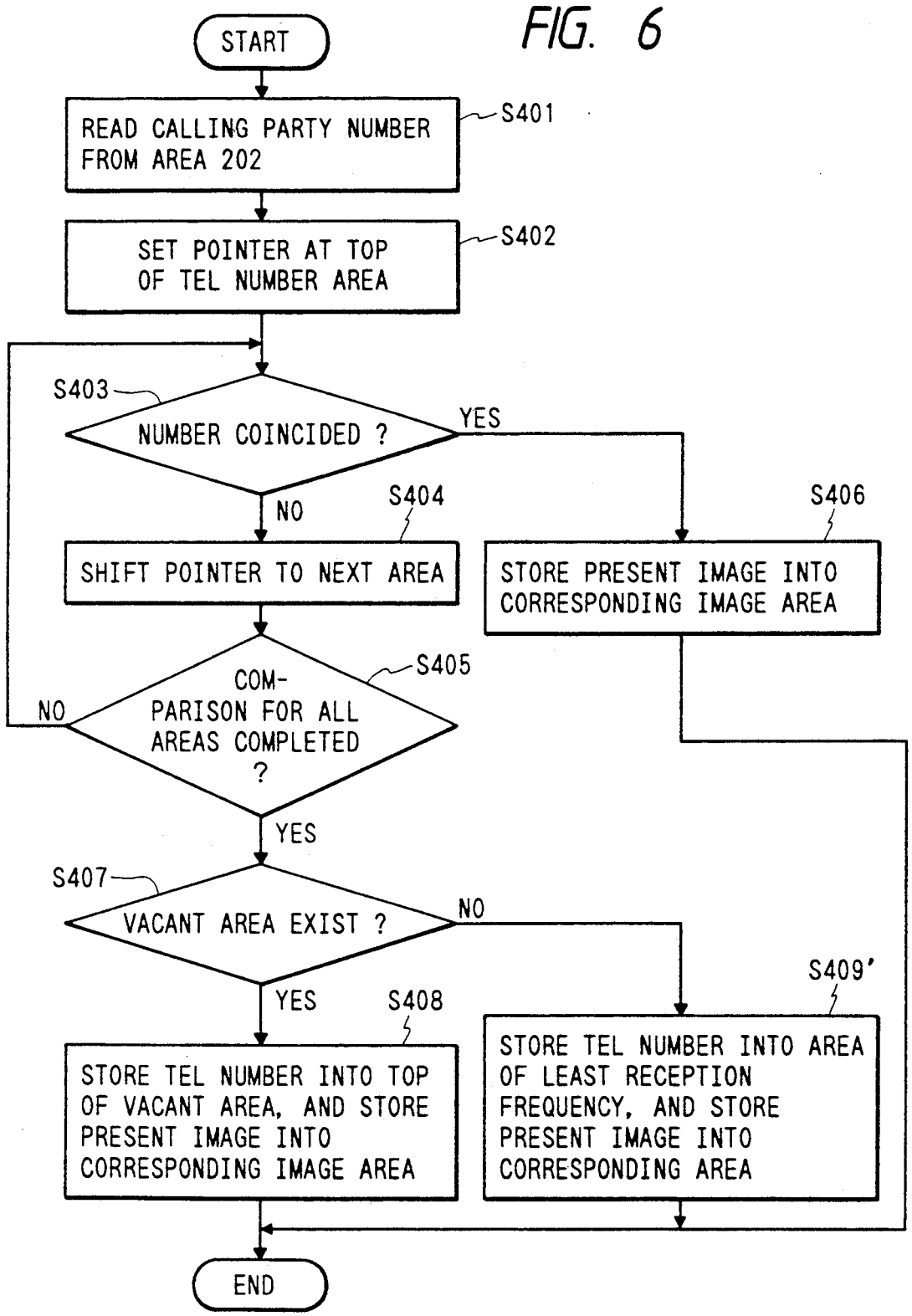

Further, the process in step S409 in FIG. 4 in the embodiment can be also executed in the following manner. That is, the frequency of the reading and displaying operations due to the call reception of the image information of the corresponding image area is determined for every area in the telephone number area 203 of the memory 2, and the area having the minimum frequency is used to store and update the calling party number and the image information corresponding to a command output from the image fetch key 11. That is, when the storage area of the image lacks, the storage image of a small frequency which is read out in response to the call reception is erased together with the corresponding telephone number, thereby updating to the new telephone number and image information. FIG. 6 shows a flowchart in this case.

Figure 7:
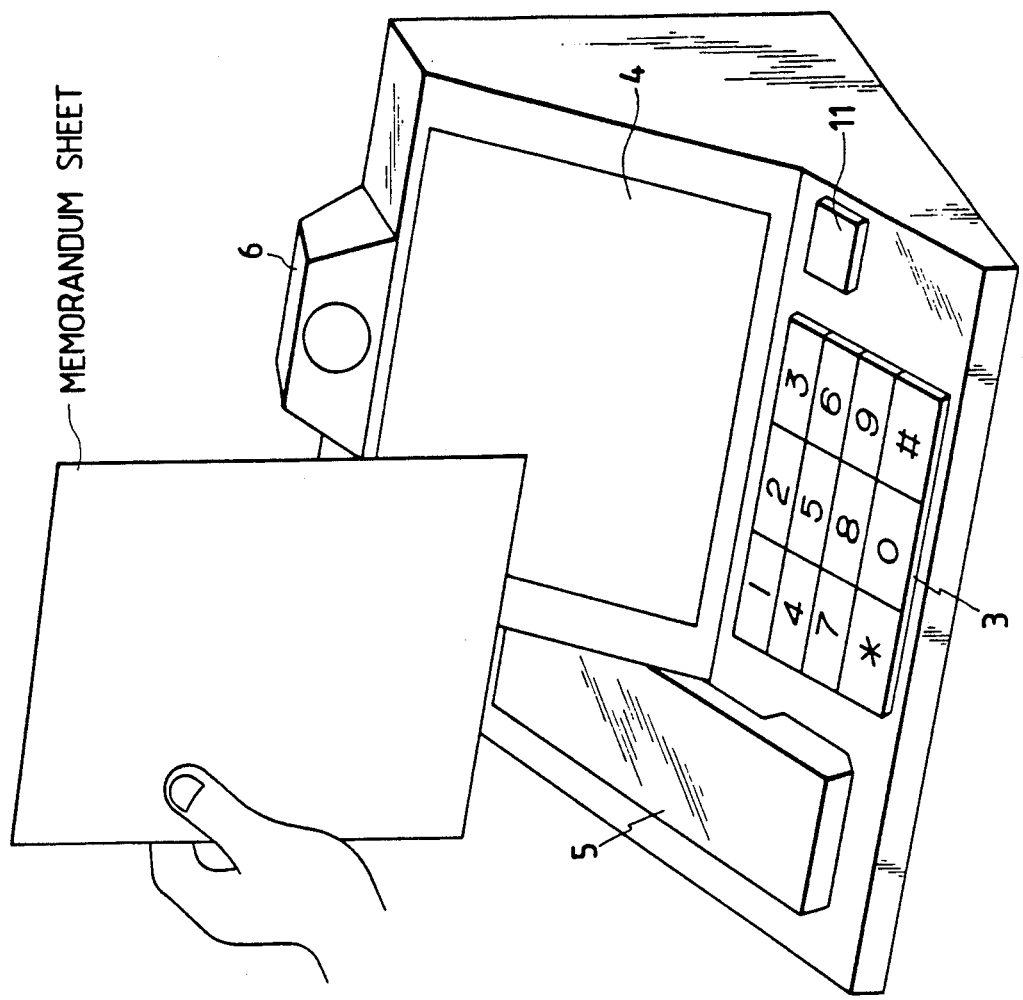
FIG. 7 is an external view of another embodiment of the television telephone set connected to the ISDN shown in FIG. 2.

In the above embodiment, the image which is sent from the calling party has been used as image information. However, the image photographed by the camera unit 6 on this side can be also input as image information to the image area 204. In this case, since the camera unit 6 for transmitting the image is also commonly used, there is no need to additionally provide another inputting means. For instance, a memorandum on which information such as a summary of a business talk with the calling party, a reminder to thank the calling party for a present, name and family construction of the calling party, and the like is put up in front of the camera unit 6 as shown in FIG. 7 and the image fetch key 11 is depressed, thereby storing the image on the memorandum into the image area 204, and the calling party telephone number is stored into the corresponding area in the telephone number area 203 by the operation key 3.

Figure 8:
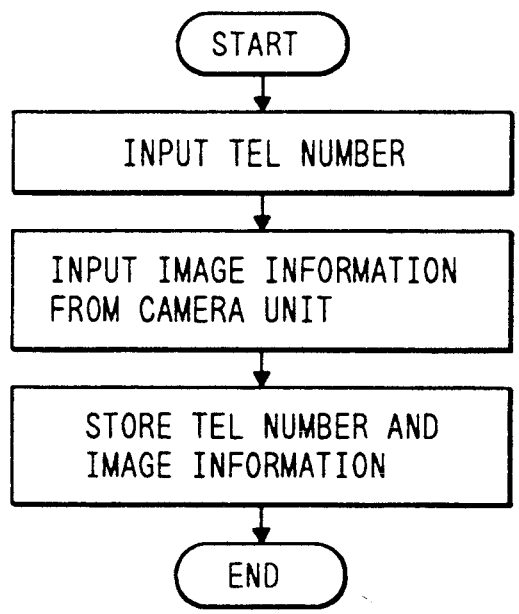
FIG. 8 is a program flowchart showing a fetching (storing) control procedure of image information which is executed in the control unit of the television telephone set shown in FIG. 7.

That is, when the television telephone executes none of the transmission and reception, by putting up the memorandum sheet to a position in front of the camera unit 6 and depressing the image fetch key 11, a program of a flowchart shown in FIG. 8 is executed. It is first instructed to input the calling party telephone number by the operation key 3. When the calling party telephone number is input, the image on the memorandum sheet is read as image information by the camera unit 6. After that, the calling party telephone number and the image information are stored into the memory 2 in accordance with the same procedure as that of the processes in step S402 and subsequent steps in FIG. 4. On the other hand, the display upon call reception is executed in accordance with the same procedure as that shown in FIG. 5.

As described in detail above, according to the first embodiment, in the television telephone set connected to the ISDN having the calling party number display service, the communicating apparatus comprises: the first memory for storing a calling party number from the ISDN upon call reception and for storing the calling party number (i.e., destination side number) in line connection; the second memory having a plurality of sets of telephone number areas and image areas respectively corresponding to the telephone number areas; the image fetching means for outputting a command to store image information which is displayed on the image display apparatus of the television telephone set into the second memory; and the control means for controlling in a manner such that the calling party number (destination side number) stored in the first memory and the image information displayed on the image display apparatus are respectively stored into either one of the plurality of sets of telephone number areas and image areas in the second memory in accordance with a command output from the image fetching means in the line connection and the calling party number stored in the first memory and the calling party numbers (destination side numbers) stored in the telephone number areas in the second memory are sequentially compared upon call reception from the ISDN and when they coincide, the image information stored in the image area in the second memory corresponding to the telephone number area in which the coincident calling party number (destination side number) has been stored is displayed on the image display apparatus. Therefore, in spite of a simple apparatus, the image information enough to presume the calling party can be previously stored on the reception side together with the corresponding telephone number by the simple operation. Therefore, just before the reception side responds to the call reception, the image information regarding the calling party, for instance, the face of the calling party or the like is displayed on the image display apparatus on the reception side and the calling party can be easily identified.

Second embodiment

As a second embodiment, explanation will now be made with respect to the case where the image corresponding to the calling party number (i.e., destination side number) upon call reception is displayed and the user can immediately disconnect the communication if he does not want to talk to the calling party and the case where a moving image is used as an image.

Figure 9:
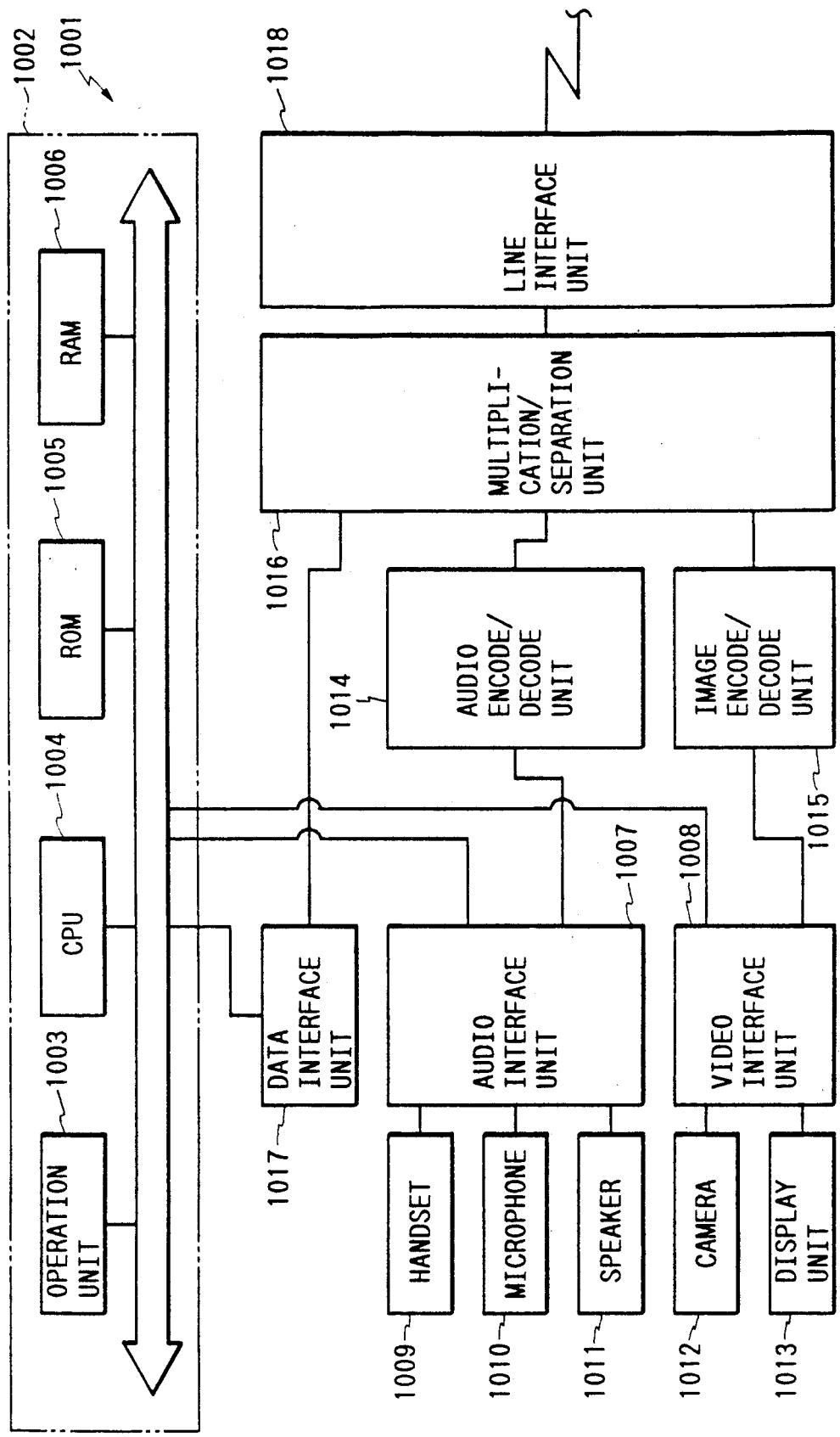
FIG. 9 is a block arrangement diagram of a multimedia communicating apparatus according to the second embodiment of the invention.

The second embodiment of the invention will now be described hereinbelow with reference to the drawings. FIG. 9 is a block arrangement diagram of a multimedia communicating apparatus which can communicate a voice, data, and a moving image according to an embodiment of the invention. In the diagram, reference numeral 1001 denotes a multimedia communicating apparatus using a line based on the ISDN (integrated services digital network). The multimedia communicating apparatus 1001 has a main control unit 1002. The main control unit 1002 includes: an operation unit 1003; a CPU 1004; a ROM 1005; and a RAM (registering means) 1006. The operation unit 1003 executes various operations of the whole multimedia communicating apparatus 1001 and has a keyboard (not shown) and a touch sensor on a display unit 1013, which will be explained hereinafter. The CPU 1004 controls the whole apparatus 1001. A program to control the multimedia communicating apparatus 1001 which is executed by the CPU 1004 has been stored in the ROM 1005. Various data, images, calling party numbers, and the like have been stored in the RAM 1006.

An audio interface unit 1007 and a video interface unit 1007 are respectively connected to the main control unit 1002. A handset (transceiver) 1009 for inputting or outputting a voice, a microphone 1010 for inputting a voice, and a speaker 1011 for generating the voice are connected to the audio interface unit 1007, respectively. The audio interface unit 1007 executes the interface with the handset 1009, microphone 1010, and speaker 1011. A camera 1012 for inputting a moving image and the display unit (display means) 1013 for outputting the moving image or a message are connected to the video interface unit 1008. The video interface unit 1008 executes the interface with the camera 1012 and display unit 1013. The audio interface unit 1007 is connected to an audio encode/decode unit 1014 for compressing or expanding an audio signal. On the other hand, the video interface unit 1008 is connected to an image encode/decode unit 1015 for compressing or expanding an image signal. The encoding/decoding process of a moving image has been disclosed in detail in the CCITT recommendation idea H.261. The audio encode/decode unit 1014 and the image encode/decode unit 1015 are connected to a multiplication/separation unit 1016 for multiplexing and separating the data, voice, and image signal. The multiplication/separation unit 1016 has been disclosed in detail in the CCITT recommendation idea H.221. A data interface unit 1017 for performing the interface with the CPU 1004 is connected between the multiplication/separation unit 1016 and the main control unit 1002. The multiplication/separation unit 1016 is connected to a line interface unit 1018 for executing the interface with the line (ISDN).

Figure 10:
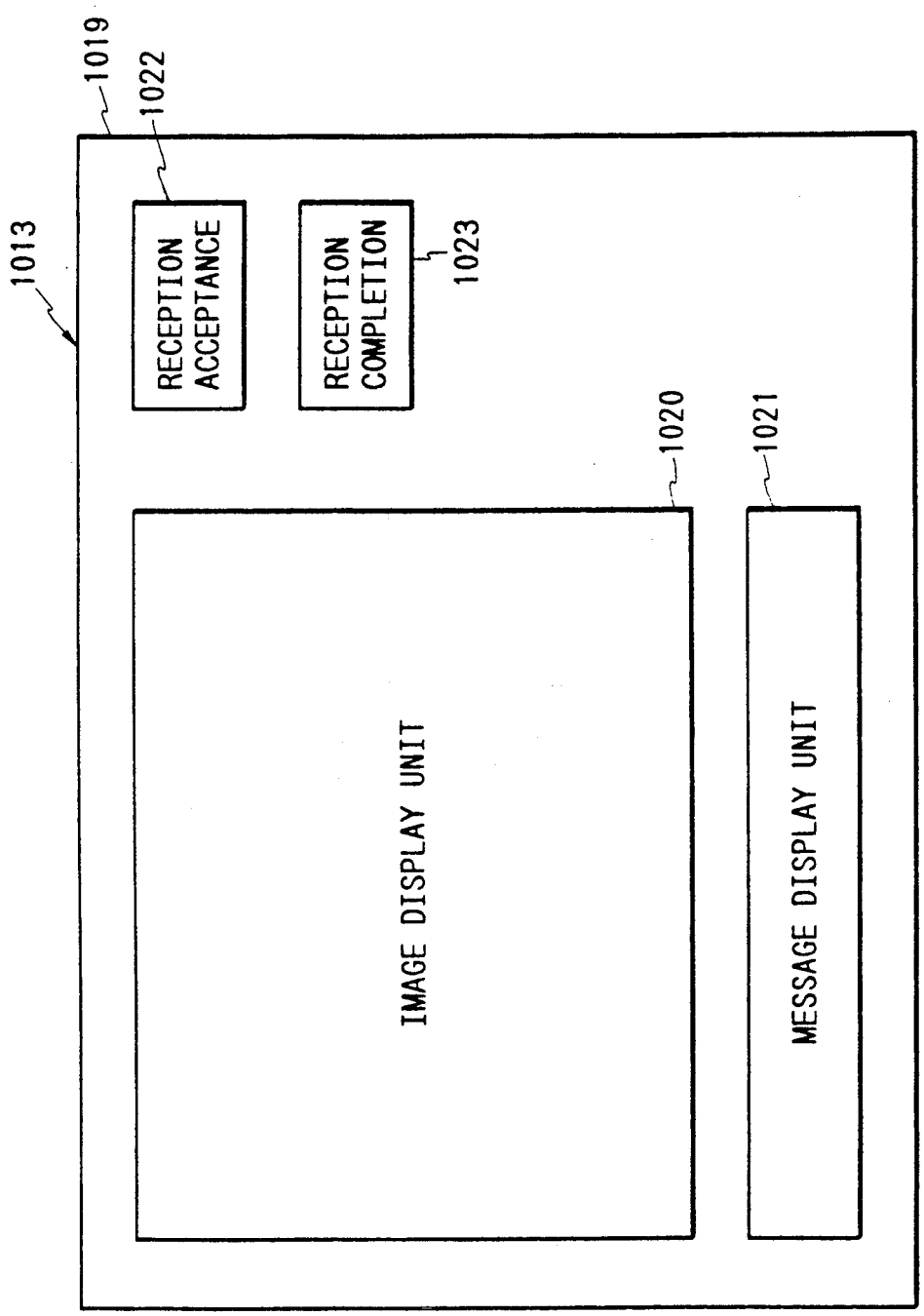
FIG. 10 is a front view of a display unit of the apparatus shown in FIG. 9.

As shown in FIG. 10, the display unit 1013 has a body 1019. An image display unit 1020 for displaying a moving image, a message display unit 1021 for displaying a message, a first touch sensor 1022 for instructing the acceptance of the reception, and a second touch sensor (disconnecting) means 1023 for instructing the end of the reception are arranged on the front surface of the body 1019, respectively.

Figure 11:
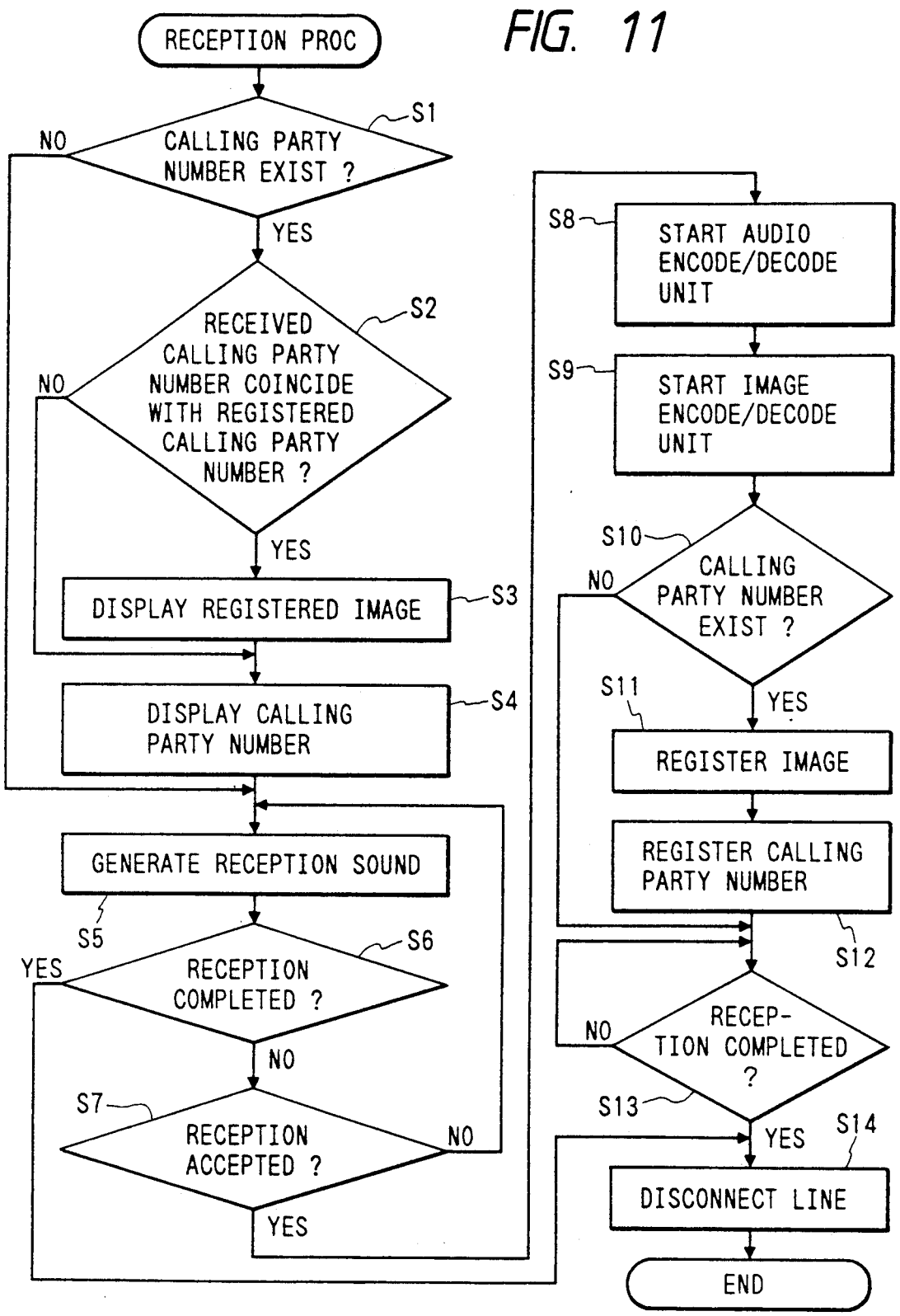
FIG. 11 is a flowchart showing a control procedure of the apparatus.

A control procedure of the multimedia communicating apparatus 1001 will now be described with reference to FIG. 11. FIG. 11 is a flowchart showing a control procedure upon reception processing. First, when a calling signal is received, a check is made in step S1 to see if the received calling party number exists or not (in the ISDN used as a line of the multimedia communicating apparatus 1001 of the invention, if the user contracted with the calling party number notification service, when a set-up signal is received from the network, the calling party number is included).

If the calling party number exists, the answer in step S1 is YES and the processing routine advances to step S2. In step S2, a check is made to see if the received calling party number coincides with the registered calling party number which has been registered in the RAM 1006 or not. If YES, step S3 follows and an image of the face which has been registered in the RAM 1006 and corresponds to the received calling party number is displayed in the image display unit 1020 of the display unit 1013. The image in the RAM 1006 is the image which was sent from the calling party during the preceding communication and has been stored as a pair together with the calling party number. The user who received the call can immediately recognize who is the calling party by seeing the image displayed in the image display unit 1020. After the image was displayed in the image display unit 1020 in step S3 as mentioned above, in the next step S4, the received calling party number is displayed in the message display unit 1021 in the display unit 1013. In the next step S5, a reception sound is generated from the speaker 1011. Then, step S6 follows. If NO in step S1, that is, if the corresponding calling party number does not exist, step S5 is executed. Further, if NO in step S2, namely, if the received calling party number differs from the registered calling party number which has been registered in the RAM 1006, step S4 is executed. In step S6, a check is made to see if the second touch sensor 1023 for instructing the end of the reception has been depressed or not. That is, if the image displayed in the image display unit 1020 relates to the partner with whom the user on the reception side does not want to speak, the second touch sensor 1023 is depressed. Therefore, if the end of the reception has been instructed by depressing the second touch sensor 1023, the answer in step S6 is YES, so that step S14 is executed and the line is immediately disconnected and the processing routine is finished. That is, the line can be disconnected before responding to the call reception. On the other hand, if the image displayed in the image display unit 1020 relates to the partner with whom the user desires to speak, the second touch sensor 1023 is not depressed. Therefore, the answer in step S6 is NO and the processing routine advances to step S7. In step S7, a check is made to see if the first touch sensor 1022 for instructing the acceptance of the reception has been depressed or not. If NO in step S7, step S5 is executed. On the contrary, if YES in step S7, that is, if the acceptance of the reception has been instructed by depressing the first touch sensor 1022, step S8 follows and the audio encode/decode unit 1014 is activated and the transmitted voice is received. Then, step S9 follows and the image encode/decode unit 1015 is activated and the moving image is received. In the next step S10, a check is made to see if the received calling party number exists or not. If YES, in the next step S11, the first sheet of the received moving image (or an arbitrary one sheet) is registered into the RAM 1006. Then, in step S12, the received calling party number is registered into the RAM 1006 in correspondence to the image which was registered in step S11. After that, step S13 follows. After completion of the registration of the image and the calling party number in steps S12 and S13, the image of the same calling party number is erased. In step S13, a check is made to see if the second touch sensor 1023 for instructing the end of the reception has been depressed or not. If the end of the reception has been instructed by depressing the second touch sensor 1023, step S14 is executed and the line is disconnected. If NO in step S13, step S13 is executed until the end of the reception is instructed. If NO in step S10, namely, if the corresponding calling party number does not exist, step S13 is executed.

In the embodiment, the calling party number has been input from a time point of the received set-up signal. However, the invention is not limited to the above method. It is also possible to use a method whereby the data including the calling party number is multiplexed and transmitted together with the voice and image on the calling party side and the calling party number in the transmitted data is separated and input on the reception side.

On the other hand, in the above embodiment, one latest received image has been registered into the RAM 1006 for one calling party number. However, the invention is not limited to the above method-but any one of the following methods ① to ④ can be also used.

① The oldest received image is registered for one calling party number and the image registering process is not executed for the same calling party number.

Figure 12:
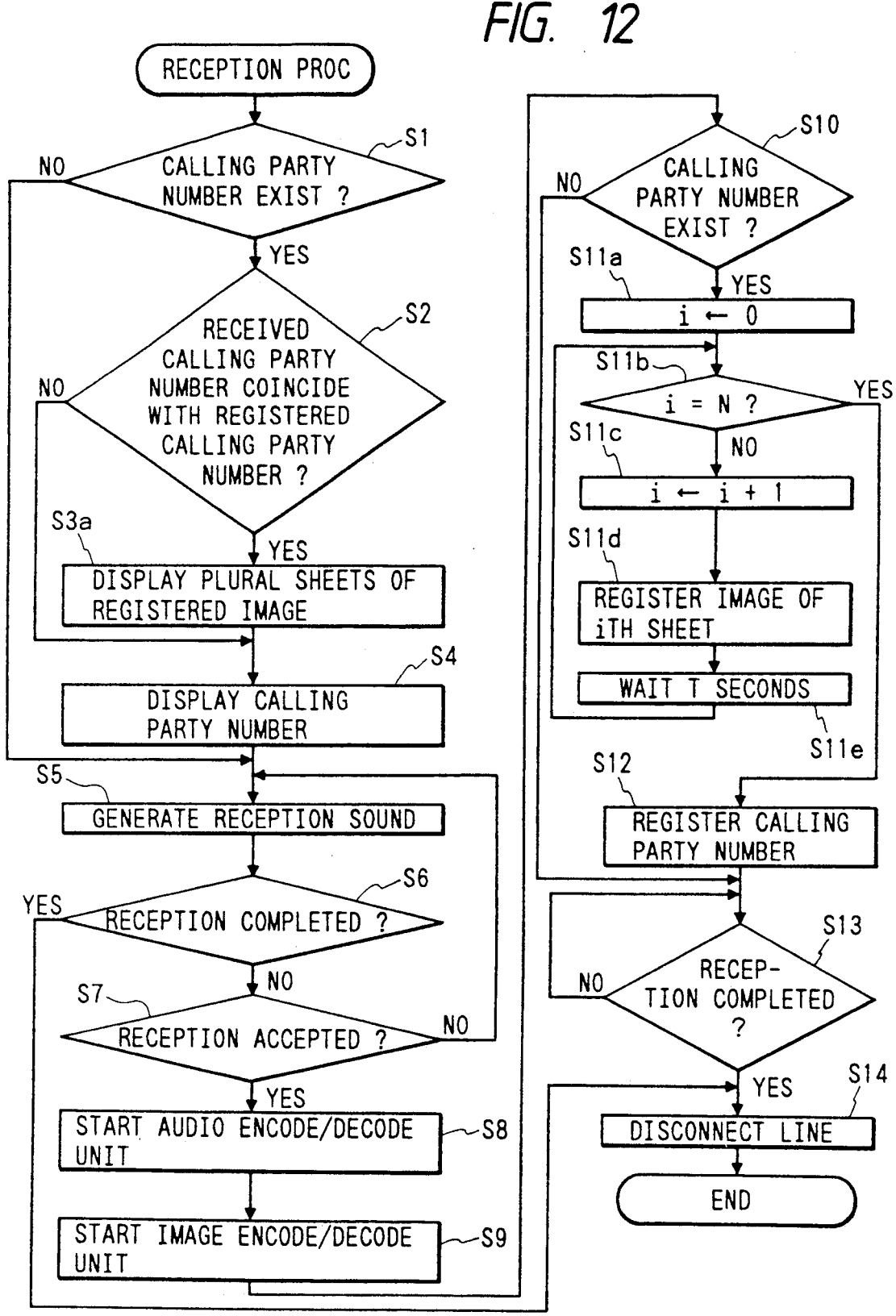
FIGS. 12, 13, and 14 are flowcharts in the case of modifying a part of the flowchart of FIG. 11.

② A plurality of sheets of received images are registered in a lump for one calling party number and a plurality of sheets of registered images are displayed in the image display unit 1020 upon call reception. FIG. 12 is a flowchart showing a control procedure upon receiving process in such an embodiment. The process in step S3a in FIG. 12 corresponds to a modification of step S3 in FIG. 11. Steps S11a, S11b, S11c, S11d, and S11e in FIG. 12 correspond to a modification of step S11 in FIG. 11. Further, the other steps in FIG. 12 are similar to those in FIG. 11. That is, in step S3a, a plurality of sheets of images which were registered in correspondence to the calling party numbers are displayed in a lump. If YES in step S10, a counter i is cleared to 0 in step S11a. In the next step S11b, a check is made to see if the count value of the counter i is equal to N (the maximum value of the number of registered image sheets for one calling party number) or not. If YES, step S12 follows. If No, step S11c follows. In step S11c, the count value of the counter i is increased by one. In step S11d, the ith sheet of image is registered. In step S11e, the apparatus waits for T seconds (preset registration interval between images) and the processing routine is returned to step S11b. Since the other steps in FIG. 12 are similar to those in FIG. 11, the same reference numerals are written on the drawings and their descriptions are omitted.

Figure 13:
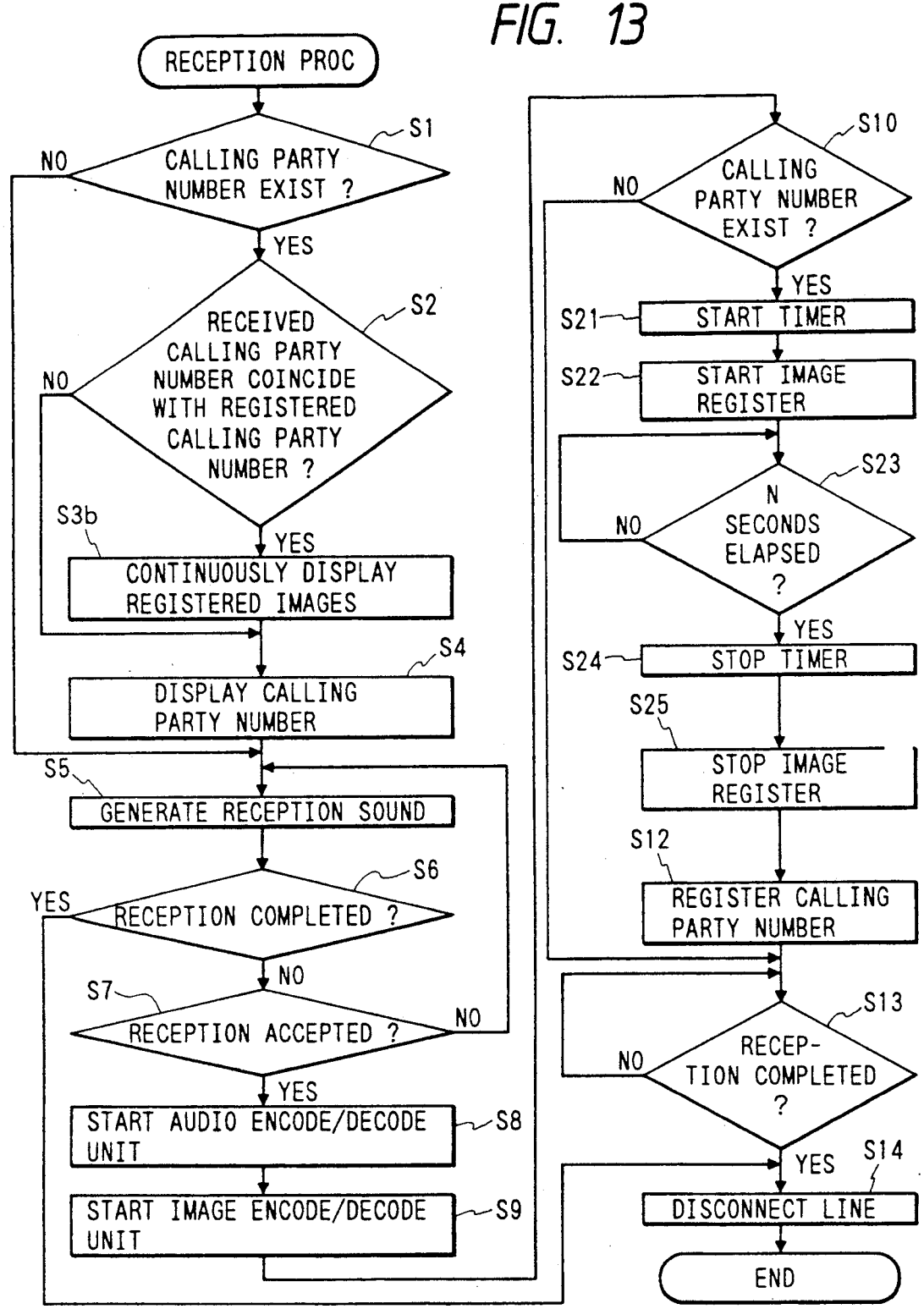

(3) Continuous received images are registered for a predetermined time for one calling party number and the continuous registered images are repetitively displayed as a moving image by the image display unit 1020 upon call reception. FIG. 13 is a flowchart showing a control procedure upon receiving process in such an embodiment. Step S3b in FIG. 13 corresponds to a modification of step S3 in FIG. 11. Steps S21, S22, S23, S24, and S25 in FIG. 13 correspond to a modification of step S11 in FIG. 11. Further, the other steps in FIG. 13 are similar to those in FIG. 11. That is, if YES in step S2, the display of the registered images is started in step S3b and the processing routine advances to step S4. The single display time of the registered images is set to N seconds and a plurality of registered images are repetitively continuously displayed for this time. Due to this, the images upon call reception can be displayed as a moving image in a manner similar to the ordinary received images. On the other hand, if YES in step S10, a timer is started in step S21. The image registration is started in step S22. In step S23, a check is made to see if N seconds have elapsed from the start of the image registration or not. If NO, step S23 is repeated until N seconds have elapsed. If N seconds have elapsed, the timer is stopped in step S24. The image registration is stopped in step S25, then step S12 follows. That is, the images are registered at a predetermined interval of time until N seconds elapse. Since the other steps in FIG. 13 are similar to those in FIG. 11, the same reference numerals are written on the drawings and their descriptions are omitted.

Figure 14:
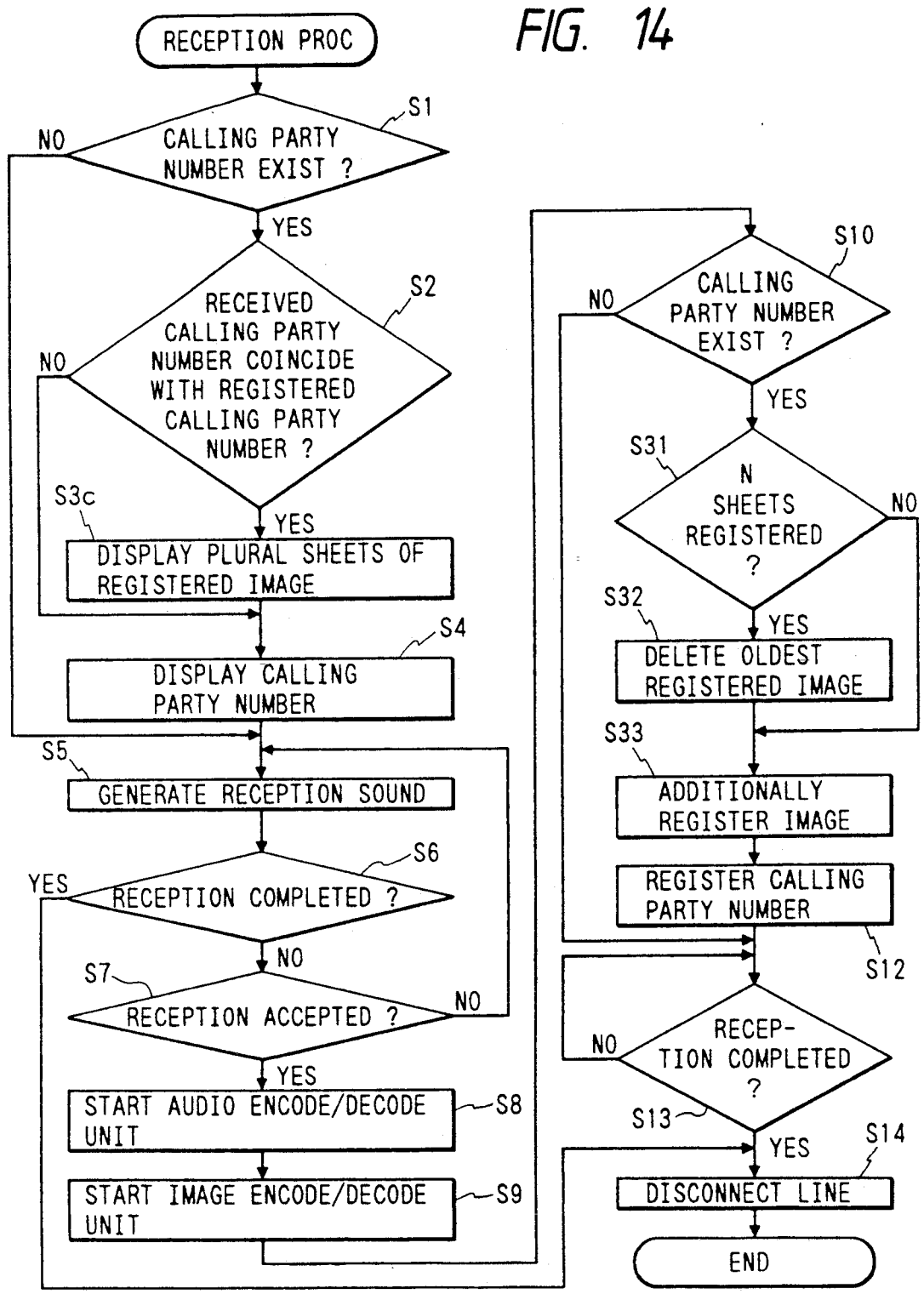

(4) Each time of the reception, the received image is additionally registered for one calling party number and a plurality of sheets of registered images are displayed in the image display unit 1020 upon call reception. FIG. 14 is a flowchart showing a control procedure upon receiving process in such an embodiment. Step S3c in FIG. 14 corresponds to a modification of step S3 in FIG. 11. Steps S31, S32, and S33 in FIG. 14 correspond to a modification of step S11 in FIG. 11. Further, the other steps in FIG. 14 are similar to those in FIG. 11. That is, in step S3c, a plurality of sheets of images which were registered for the calling party number are displayed in a lump. On the other hand, if YES in step S10, a check is made in step S31 to see if the number of images registered for the calling party number has reached N (preset maximum number of sheets) or not. If YES, step S32 follows. If NO, step S33 follows. In step S32, the oldest registered image is deleted (at this time, the number of registered images is equal to N−1). In step S33, the image which is received at present is additionally registered and step S12 follows. Since the other steps in FIG. 14 are similar to those in FIG. 11, the same reference numerals are written on the drawings and their descriptions are omitted.

Further, in the embodiment, although the received images have been registered into the RAM 1006, the invention is not limited to such a method. The received images can be also registered to a magnetic disk or a magnetic tape.

As mentioned above, the multimedia communicating apparatus of the second embodiment of the invention comprises: the registering means for registering the received image together with the calling party number upon image reception; display means for displaying the image registered by the registering means corresponding to the calling party number when the same calling party number as the calling party number registered by the registering means was received; and disconnecting means for disconnecting the communication without starting a speech in the case where the image displayed by the display means relates to a partner with whom the user does not want to speak.

Therefore, upon reception, by seeing the image of the face of the partner displayed by the display means, it is possible to immediately recognize who is the partner without starting the speech. Therefore, the communication can be soon disconnected for the partner to whom the user doesn't want to make a speech.

On the other hand, according to the embodiment, upon reception, a plurality of registered images can be simultaneously displayed or can be displayed as a moving image. Further, a recognition degree of the communication party upon call reception can be raised. Although there is also a case where a plurality of persons use the apparatuses of the same calling party number, according to the embodiment shown in FIG. 14, the received images are registered every plurality of reception times and a plurality of registered images are displayed upon call reception. Consequently, a plurality of persons who use the apparatuses of the same calling party number can be recognized in a lump upon call reception.

Although the invention has been described above with respect to the preferred embodiments, the invention is not limited to the foregoing embodiments. Many modifications and variations are possible within the spirit and scope of the appended claims of the invention.

What is claimed is:

1. A communication apparatus comprising:
   receiving means for receiving image data sent from a communication partner apparatus;
   memory means for storing the image data received by said receiving means during a communication with the communication partner apparatus and ID data in correspondence with the image data sent from the communication partner apparatus, the ID data indicating the communication partner apparatus;
   display means for receiving the ID data upon reception from the communication partner apparatus and for reading out the image data from said memory means corresponding to the received ID from said memory means and for displaying the image data;
   means for selecting a storing operation of the image data into said memory means, and wherein when the storing operation is selected by said selecting means, said memory means stores the image data which is being received;
   wherein said memory means stores a plurality of image data from a plurality of communication apparatuses in correspondence with a plurality of ID data;
   and wherein said memory means further comprises a plurality of storage areas, and wherein when the storing operation is selected by said selecting means and all said storage areas in said memory means contain data, the ID data and the image data in a predetermined storage area are erased and the ID data of the communication partner apparatus during communication and the image data from the communication partner apparatus are newly stored into a predetermined storage area;

and wherein the predetermined storage area from which the ID data and the image data are erased is an area in which the image data from the communication apparatus having a small reception frequency has been stored.

2. An apparatus according to claim 1, wherein when the image data corresponding to the ID data indicative of the communication partner apparatus has already been stored in the memory means, the stored image data is updated to the newly received image data.

3. An apparatus according to claim 1, further comprising disconnecting means for disconnecting the communication before reception of the image data from the communication partner apparatus.

4. A television telephone connected to an ISDN having a calling party number display service, comprising:
   a first memory for storing a calling party number from the ISDN upon call reception;
   a second memory having telephone number areas and image areas corresponding to the telephone number areas;
   an image display apparatus for displaying image information;
   image fetching means for outputting a command to store image information which is displayed by said image display apparatus of said television telephone into said second memory, wherein the image information which is displayed by said image display apparatus is information sent by a calling party through the ISDN;
   means for respectively storing the calling party number stored in said first memory and the image information displayed by said image display apparatus into the telephone number area and the image area in said second memory in accordance with a command output from said image fetching means during connection of a line;
   means for comparing the calling party number stored in said first memory and the calling party numbers stored in the telephone number areas in said second memory upon call reception from the ISDN;
   control means for controlling in a manner such that when those calling party numbers coincide, the image information stored in the image area said second memory corresponding to the telephone number area in which the coincident calling party number has been stored is displayed by said image display apparatus; and
   wherein said control means controls in a manner such that a frequency when reading out and displaying the image information stored in the corresponding image area is counted for every telephone number area in said second memory and the telephone number area having the smallest frequency is used to store and update the calling party number and the image information corresponding to a command output from said image fetching means.

5. A telephone according to claim 4, wherein said first memory stored the calling party number from the ISDN when an incoming call from the calling party is received and stores the calling party number from an operation key when an outgoing call is placed from the telephone.

6. A telephone according to claim 4, wherein said first memory comprises a calling party number area in call reception and a calling party number area in line connection.

7. A telephone according to claim 4, wherein said image fetching means generates an output signal by touching said image display apparatus.

8. A telephone according to claim 4, wherein said control means controls in a manner such that a frequency when reading out and displaying the image information stored in the corresponding image area is counted for every telephone number area in said second memory and the telephone number area having the smallest frequency is used to store and update the calling party number and the image information corresponding to a command output from said image fetching means.

9. A communication apparatus comprising:
   receiving means for receiving image data sent from a communication partner apparatus and ID data indicative of the communication partner apparatus;
   memory means for storing the image data and the ID data received by said receiving means, said memory means being capable of storing the plurality of image data from the plurality of communication apparatuses corresponding to the plurality of ID data;
   display means for receiving the ID data upon reception from the communication partner apparatus and for reading out the image data corresponding to the received ID data from said memory means and for displaying the image data; and
   control means for deleting the image data and the ID data having a small communication frequency from the communication apparatus when said memory means is full, and storing the newly received image data and the ID data into said memory means.

10. An apparatus according to claim 9, wherein said memory means stores a plurality of sheets of images in correspondence with the single ID data.

11. An apparatus according to claim 10, wherein said display means simultaneously displays the plurality of sheets of images.

12. An apparatus according to claim 10, wherein said display means sequentially displays the plurality of sheets of images as a moving image.

* * * * *

UNITED STATES PATENT AND TRADEMARK OFFICE
CERTIFICATE OF CORRECTION

PATENT NO. : 5,305,097
DATED : April 19, 1994
INVENTOR(S) : Ryoichiro SATO et al.

It is certified that error appears in the above-indentified patent and that said Letters Patent is hereby corrected as shown below:

ON COVER PAGE:

At [56], Under Heading "FOREIGN PATENT DOCUMENTS":
   Line 4, "0212056 8/1989 Japan ................379/53" should be deleted.

COLUMN 1:
   Line 42, "Feb. 8, 1989." should read --Feb. 8, 1989 and issued as U.S. Patent No. 5,001,709 on March 19, 1991.--.

COLUMN 4:
   Line 66, "The present p fin-" should read --The present program is fin- --.

COLUMN 12:
   Line 16, "doesn't" should read --does not--.

COLUMN 13:
   Line 46, "said" should read --of said--.

UNITED STATES PATENT AND TRADEMARK OFFICE
CERTIFICATE OF CORRECTION

PATENT NO.  : 5,305,097
DATED       : April 19, 1994
INVENTOR(S) : Ryoichiro Sato, et al It is certified that error appears in the above-indentified patent and that said Letters Patent is hereby corrected as shown below:

Column 14, line 17, claim 8, should be deleted.

Signed and Sealed this

Twenty-ninth Day of November, 1994

Attest:

BRUCE LEHMAN

Attesting Officer    Commissioner of Patents and Trademarks